J. J. CRAWFORD.
VEHICLE SPRING SHACKLE.
APPLICATION FILED NOV. 15, 1916.

1,219,259. Patented Mar. 13, 1917.

WITNESSES

INVENTOR
John J. Crawford
BY
ATTORNEYS

UNITED STATES PATENT OFFICE.

JOHN J. CRAWFORD, OF NEW YORK, N. Y.

VEHICLE-SPRING SHACKLE.

1,219,259.  Specification of Letters Patent.  Patented Mar. 13, 1917.

Application filed November 15, 1916. Serial No. 131,433.

*To all whom it may concern:*

Be it known that I, JOHN J. CRAWFORD, a citizen of the United States, and a resident of the city of New York, West New Brighton, borough of Richmond, in the county of Richmond and State of New York, have invented a new and Improved Vehicle-Spring Shackle, of which the following is a full, clear, and exact description.

The object of the invention is to provide a new and improved shackle more especially designed for use in connection with the leaf springs of automobiles and other vehicles, and arranged to act as a shock absorber and to guard against breaking of the vehicle springs. Another object is to provide a very simple means for attaching the spring shackle to the leaf springs and to the front axle or the rear axle housing of the automobile.

In order to accomplish the desired result, use is made of a vehicle spring shackle having a bowed resilient body terminating at one end in integral spaced knuckles and terminating at the other end in an integral attaching bolt.

A practical embodiment of the invention is represented in the accompanying drawings forming a part of this specification, in which similar characters of reference indicate corresponding parts in all the views.

Figure 1:
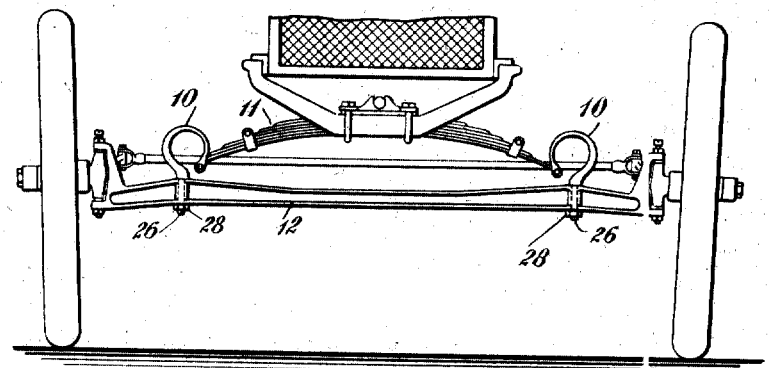
Figure 1 is a front end elevation of a portion of an automobile provided with the improved spring shackle.
Figure 2:
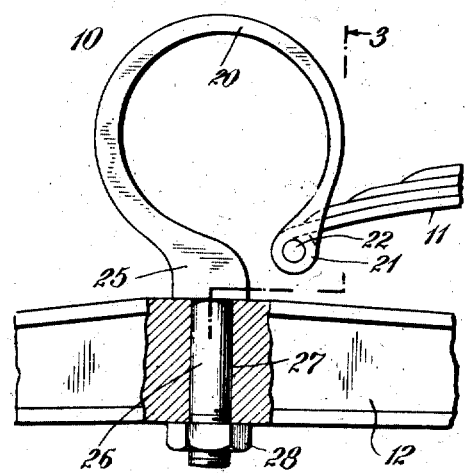
Fig. 2 is an enlarged elevation of the spring shackle connected with one end of the body spring and at the other end with the front axle shown partly in section.
Figure 3:
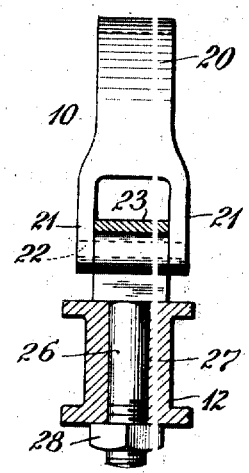
Fig. 3 is a sectional elevation of the same on the line 3—3 of Fig. 2.
Figure 4:
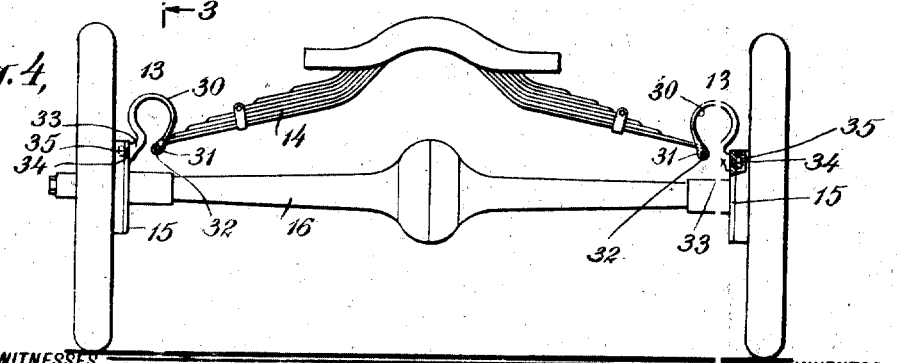
Fig. 4 is a rear end elevation of a portion of an automobile as shown in Fig. 1.

The spring shackles 10 connect the free ends of the front leaf spring 11 with the front axle 12 of an automobile, and, as shown in Fig. 4, the spring shackles 13 connect the free ends of the vehicle rear leaf spring 14 with the flanges 15 of the rear axle housing 16 of the automobile. Each of the spring shackles 10 and 13 consists of a bowed resilient body 20 terminating at its free end in spaced knuckles 21 carrying a pin 22 engaged by the corresponding eye 23 of the under main member of the leaf spring 11, the said eye 23 extending between the knuckles 21. The body 20 of the spring shackle 10 or 13 is provided at its other end with an integral shoulder 25 and the said body gradually increases in thickness from the knuckle end 21 to the shoulder 25 so as to give the desired strength to the spring shackle. The shoulder 25 of the shackle 10 is seated on the top of the axle 12 and from the bottom of the shoulder 25 extends integrally a bolt 26 passing through an aperture 27 formed in the axle 12. A nut 28 screws on the lower end of the bolt 26 and against the under side of the axle 12 to securely fasten the spring shackle in position on the axle 12. It is understood that on screwing up the nut 28, the shoulder 25 is drawn in firm contact with the top of the axle 12 to securely fasten the spring shackle 10 in position and to hold it against accidental displacement or loosening. The spring shackle 13 is similar to the spring shackle 10, that is, its body 30 terminates in knuckles 31 carrying a pin 32 engaged by the corresponding eye of the leaf spring 14, and the body 30 is provided with an enlarged shoulder portion 33 similar to the shoulder portion 25 of the spring shackle 10. From the shoulder 33 extends a threaded bolt 34 engaging the corresponding flange 15 of the housing 16, and a nut 35 screws on the bolt 34 and against the face of the flange 15 to fasten the spring shackle 13 to the flange 15.

The spring shackle shown and described can be readily applied to the axle 12 or to the flange 15 of the housing 16 in place of the ordinary link shackle now generally used, and hence no change whatever is required in the parts referred to except that the link shackle is displaced by the spring shackle 10 or 13.

It will be noticed that the bodies 20 and 30 of the spring shackles 10 and 13 extend in vertical transverse planes passing through the axes of the front and rear axles, above which latter the leaf springs 11 and 14 are located so that the spring shackles are not liable to bind on the up and down movement of the body of the vehicle relative to the running gear thereof.

It will also be noticed that by arranging the spring shackles in the manner described the body 20 forms nearly a circle and the knuckles 21 are close to the enlarged center portion 25 to insure the utmost resiliency of the body and hence the spring shackles readily act as shock absorbers, that is, take up most of the minor vibrations and prevent the breaking of the vehicle springs 11 and 14.

The spring shackles 10 and 13 can be cheaply manufactured and readily applied to automobiles as now constructed.

Having thus described my invention, I claim as new and desire to secure by Letters Patent:—

1. As an article of manufacture, a vehicle spring shackle, comprising a bowed resilient body terminating at one end in integral spaced knuckles and terminating at the other end in an integral attaching bolt.

2. As an article of manufacture, a vehicle spring shackle, comprising a bowed resilient body terminating at one end in integral spaced knuckles and terminating at the other end in an integral shoulder and a bolt extending integrally from the said shoulder.

3. As an article of manufacture, a vehicle spring shackle, comprising a bowed resilient body terminating at one end in integral spaced knuckles and terminating at the other end in an integral shoulder from which extends an integral bolt, the said body gradually increasing in thickness from the knuckle end to the shoulder end.

JOHN J. CRAWFORD.